(12) United States Patent
Jacob et al.

(10) Patent No.: US 12,644,829 B2
(45) Date of Patent: Jun. 2, 2026

(54) MOLTEN SALT IMPURITY SENSOR

(71) Applicant: Wisconsin Alumni Research Foundation, Madison, WI (US)

(72) Inventors: Jojo Jacob, Madison, WI (US); Mark Anderson, Oregon, WI (US); Scott Sanders, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 132 days.

(21) Appl. No.: 18/791,549

(22) Filed: Aug. 1, 2024

(65) Prior Publication Data

US 2026/0036513 A1 Feb. 5, 2026

(51) Int. Cl.
| | |
|---|---|
| *G01N 21/31* | (2006.01) |
| *G01N 21/90* | (2006.01) |
| *G01N 21/94* | (2006.01) |

(52) U.S. Cl.
CPC ............. *G01N 21/31* (2013.01); *G01N 21/90* (2013.01); *G01N 21/94* (2013.01); *G01N 2201/022* (2013.01); *G01N 2201/0636* (2013.01); *G01N 2201/08* (2013.01)

(58) Field of Classification Search
CPC ........ G01N 21/31; G01N 21/90; G01N 21/94; G01N 2201/022; G01N 2201/0636; G01N 2201/08
See application file for complete search history.

(56) References Cited

U.S. PATENT DOCUMENTS

| | | | |
|---|---|---|---|
| 2003/0174325 A1* | 9/2003 | Zhang | G01N 21/718 356/318 |
| 2012/0026495 A1* | 2/2012 | Park | G01N 21/31 356/326 |

* cited by examiner

*Primary Examiner* — Seung C Sohn
(74) *Attorney, Agent, or Firm* — Boyle Fredrickson, S.C.

(57) ABSTRACT

A molten salt impurities sensor makes use of absorption spectrometry through a specially constructed and hardened probe inserted in the molten salt. The probe provides an opposed window and mirror, both adapted to resist the influence of molten salt, to allow the passage of light from the absorption spectrometer through the window to reflect off of the mirror and to be returned to the absorption spectrometer after passing through the molten salt.

14 Claims, 2 Drawing Sheets

MOLTEN SALT IMPURITY SENSOR

STATEMENT REGARDING FEDERALLY SPONSORED RESEARCH OR DEVELOPMENT

This invention was made with government support under DE-AR0001293 awarded by the US Department of Energy/ARPA-E. The government has certain rights in the invention.

CROSS REFERENCE TO RELATED APPLICATION

--

BACKGROUND OF THE INVENTION

The present invention relates to sensors for detecting impurities in molten salt and, in particular, to a sensor for providing spectroscopy measurements of molten salt for impurity detection.

There is a growing interest in molten salts due to their significant potential as a heat transfer fluid in high temperature applications such as for coolants in proposed nuclear power generation and concentrated solar power plants, and as a heat storage medium for thermal energy storage systems. Molten salts have a higher melting and boiling point than water, leading to increased thermal efficiency in heat transfer and storage while minimizing risks associated with high pressures. Nuclear energy systems can also utilize fuel dissolved in the salt such that the salt acts as both the coolant and the fuel, allowing constant removal of fission products, improved fuel consumption, and reduced nuclear waste production.

One of the major challenges to the use of molten salt arises from the highly corrosive nature of salts at elevated temperatures, such as leads to the breakdown of materials in contact with the salt. It is desirable to be able to monitor breakdown materials in the molten salt during operation to assess the health of operational salt loops, enhancing overall safety and reducing operational costs.

Current in-situ sensors use electrochemical techniques, radionuclide tracing techniques, and laser-induced breakdown spectroscopy but suffer from significant limitations.

SUMMARY OF THE INVENTION

The present invention provides a molten salt impurity sensor allowing spectrometry through a specially constructed and hardened probe inserted directly in the molten salt. The probe provides an opposed window and mirror, both adapted to resist the influence of molten salt and to allow the passage of light from a light source through the window to reflect off of the mirror and to be returned to an absorption spectrometer after passing through the molten salt. Important in implementation of the invention was the ability to identify window and mirror materials that could resist significant degradation by the high temperature and corrosive effects of the molten salt to make such measurements practical and that could be integrated in a way to resist molten salt infiltration.

In one embodiment, the invention provides a high-temperature probe for measurement of molten salt impurities having a probe shaft with an axial channel extending along a probe axis to a distal channel end. A window resistant to molten salt is attached to a distal end of the channel to prevent ingress of molten salt into the channel and operates to protect a first and second optical fiber extending along the probe axis to a point proximate to the window. These optical fibers direct light through and receive light through the window, respectively. The probe also provides a mirror resistant to molten salt and a mirror support extending along the probe axis beyond the window to hold and position the mirror to receive light from the first optical fiber and reflect the light to be received by the second optical fiber, the mirror support providing an open portion allowing passage of molten salt between the mirror and the window at the desired pathlength.

It is thus a feature of at least one embodiment of the invention to permit sensitive spectrographic measurements of molten salt. In this regard, the present inventors have recognized that materials sufficiently resistant to corrosion and degradation can be identified to provide a sufficient signal through molten salt for meaningful spectrographic measurements.

At least one of the window and mirror may provide an outer carbon layer, such as, but not limited to, diamond, glassy carbon, and graphene.

It is thus a feature of at least one embodiment of the invention to provide optical components that can resist the high temperatures and corrosive effects of molten salts.

The mirror may be curved to focus light received from the first optical fiber on the second optical fiber.

It is thus a feature of at least one embodiment of the invention to provide sufficient sensitivity in the probe for precision measurements through the dispersive liquid salt.

The optical fibers may be coated with gold.

It is thus a feature of at least one embodiment of the invention to improve the resilience of the optical fibers in this demanding environment.

In one embodiment, the probe shaft and mirror support may be monolithic carbon and the window may be fused to the monolithic carbon.

It is thus a feature of at least one embodiment of the invention to provide a probe that is highly resistant to corrosion and infiltration by corrosive molten salts.

In one embodiment the probe may further use compression seals on either side of a periphery of the window sealing the window to the probe shaft and, in this case, the probe shaft may provide an inner and outer tubular component flanking a front and rear surface of the window, respectively, and a proximal end of the probe may provide a compressor for shifting the relative location of the inner and outer tubular members to provide the compression on the window.

It is thus a feature of at least one embodiment of the invention to provide a robust method of sealing the window to the probe with reduced risk of damage to the window.

The optical fibers may be held within ceramic tubes.

It is thus a feature of at least one embodiment of the invention to provide support for the optical fibers while reducing heat conduction through the probe.

These particular objects and advantages may apply to only some embodiments falling within the claims and thus do not define the scope of the invention.

DETAILED DESCRIPTION OF THE PREFERRED EMBODIMENT

Figure 1:
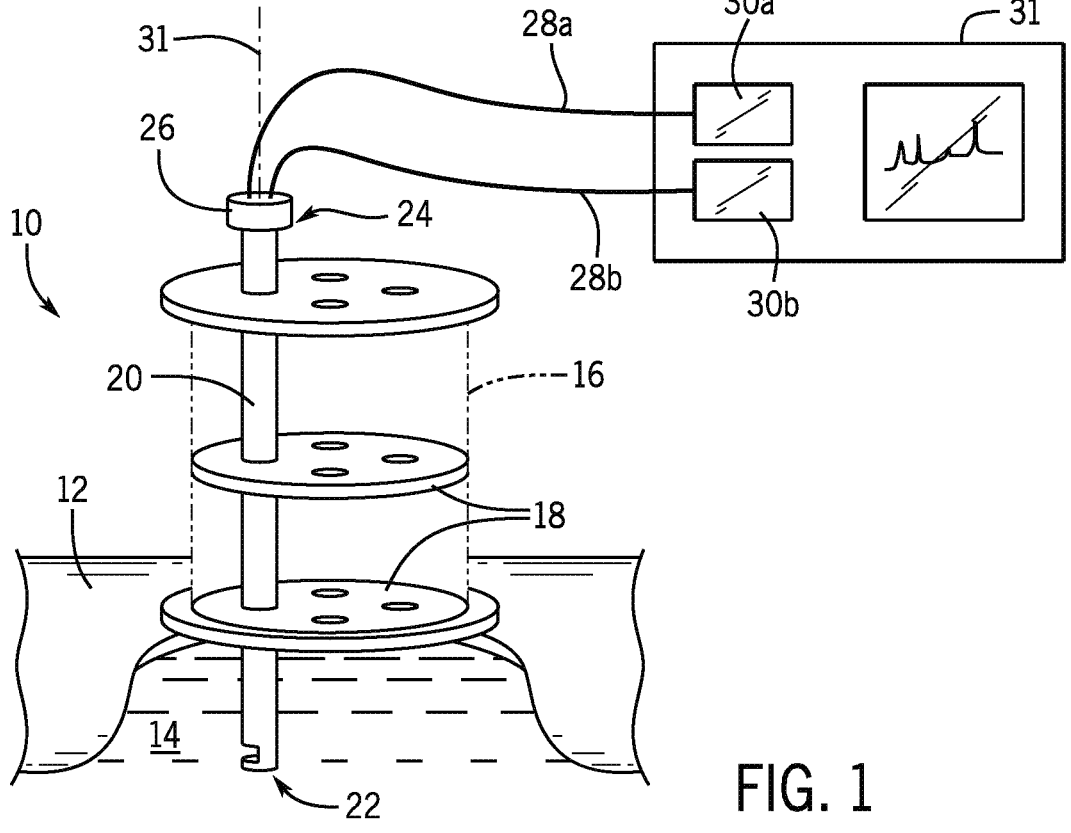
FIG. 1 is a fragmentary, perspective, phantom view of a molten salt vessel holding molten salt that may be monitored by an impurity sensing probe according to the present invention.

Referring now to FIG. 1, a molten salt conduction system 10 may provide for a molten salt vessel 12 holding a molten salt 14, for example, at a temperature in excess of 600° C. The molten salt 14 may be, for example, suitable for heat transfer or energy storage and providing a fluoride, chloride, nitrates, or carbonate chemistry. More specifically, in one embodiment, the molten salt may be a fluoride melt such as FLiNaK having 46.5% LiF-11.5% NaF-42% KF, FLiBe (lithium fluoride and beryllium fluoride) or mixture of $MgCl_2$, NaCl or KCL The molten salt vessel 12 may have an access port 16 communicating with the molten salt through seals 18 (typically, compression fittings of the type known in the art) to allow the insertion of instrumentation for monitoring the molten salt 14 including, for example, a probe 20 per the present invention. In one embodiment the probe 20 may have an outer diameter of ½ inch to be received within a standard opening of the access port 16.

The probe 20 will have a distal end 22 that may be positioned within the molten salt 14 and a proximal end 24 outside of the access port 16. In one embodiment the proximal end 24 provides a cap 26 that may be rotated for gasket compression (to be described below) and an exit opening for optical fibers 28 passing to a spectrometer 31. In this regard, the spectrometer 31 will provide for a light source 30a communicating with a first optical fiber 28a and a light detector 30b communicating with a second optical fiber 28b.

In one embodiment the spectrometer 31 may be an absorption spectrometer providing for sensitivity from 400 to 900 nm; however, a larger range of wavelength sensitivities is also contemplated including infrared and ultraviolet regions. In other embodiments the spectrometer 31 may be a Ramen spectrometer. The spectrometer will be capable of monitoring corrosion products (for example, stainless steel SS316 constituents, chromium, iron, and nickel as well as radioactive actinides) at concentrations of 20-1000 ppm. In one embodiment, the spectrometer may be the Flame S spectrometer available from Ocean Insight providing the light detector 30b and a halogen light source providing the light source 30a also available from Ocean Insight under the trade name LS-1, together providing a wavelength range from 200 to 850 nm with a 1.34 nm resolution.

Figures 2, 3:
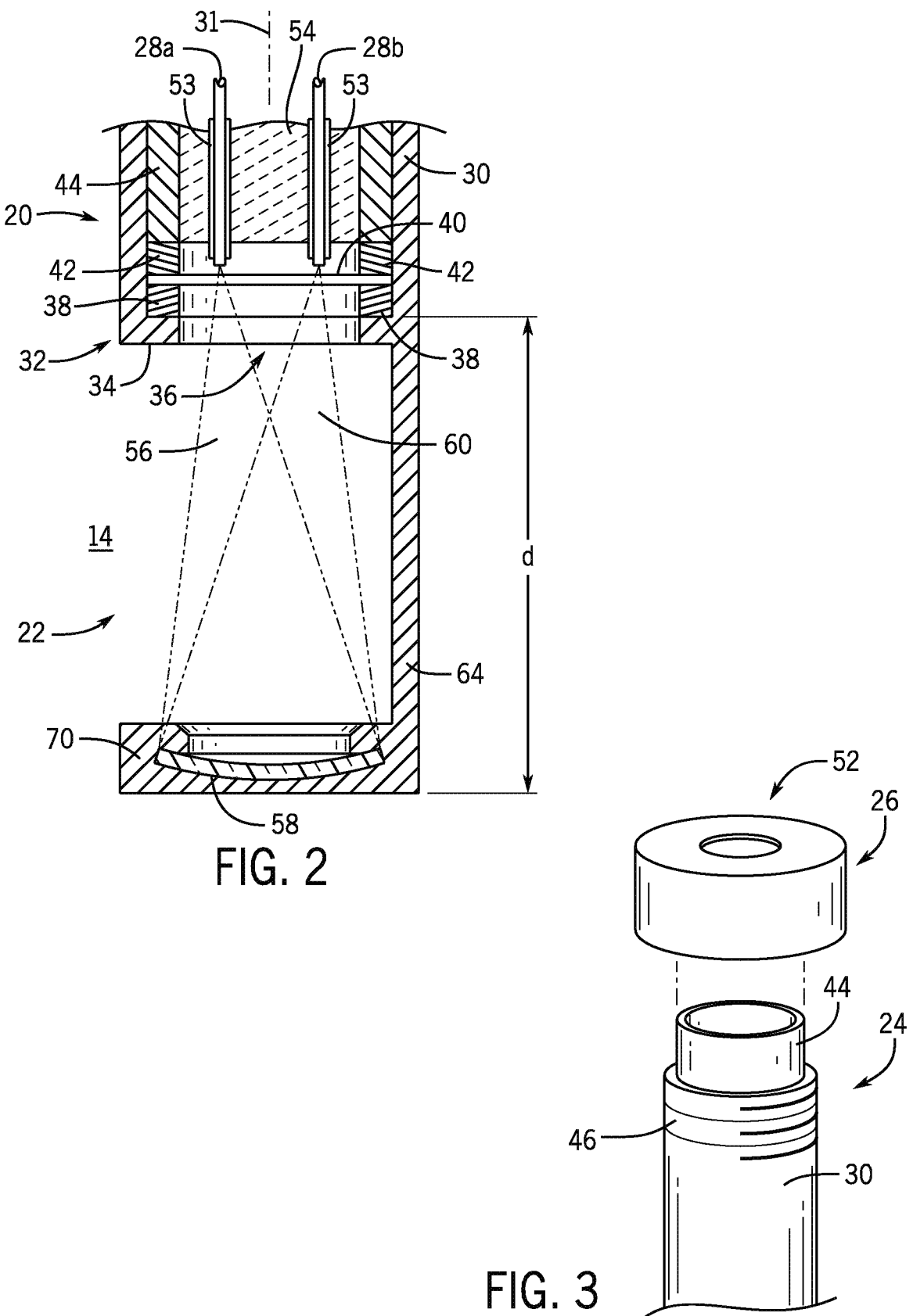
FIG. 2 is an elevational cross-section of a distal end of impurity sensing probe of FIG. 1 as inserted in the molten salt showing its various components.
FIG. 3 is a fragmentary perspective view of a proximal end of the impurity sensing probe of FIGS. 1 and 2 showing a threaded cap for adjustment of gasket compression about a distal window.

Referring now also to FIG. 2, in one embodiment, the probe 20 may have an outer tube 30 fabricated of a corrosion resistant material that may operate in the necessary high temperatures, for example, fabricated from Monel. The outer tube 30 may extend along an insertion axis 31 and terminate at a distal shaft end 32. The distal shaft end 32 provides a radially inwardly extending flange 34 positioned about an axially centered window opening 36. A first ring gasket 38 may rest on top of the flange (oriented as depicted) to support the periphery of a window 40 to allow light passage through the window opening 36 upwardly into the outer tube 30.

A second ring gasket 42 is placed above and in contact with the window 40, the second ring gasket 42 aligned with the first ring gasket 38 at the periphery of the window 40 to allow the passage of light therethrough.

The first ring gasket 38 and second ring gasket 42 may be compressed together about the window 40 by a second tube 44 fitting coaxially within the first tube 30 contacting the upper surface of the upper gasket 42. Downward motion of the second tube 44 compresses the first ring gasket 38 and second ring gasket 40 between the lower edge of the second tube 44 and the upper surface of the inwardly extending flange 34.

Referring momentarily to FIG. 3, the second tube 44 may extend to the proximal end 24 out of the outer tube 30. The proximal end 24 of the outer tube 34 may present external threads that will engage corresponding internal threads on the cap 26.

Tightening of the cap 26 on to the outer tube 30 pushes downwardly on the upper edge of the inner tube 44 thus adjusting the compression of the gaskets 38 and 42. This pressure adjustment may be done, for example, while performing a helium leak test to ensure proper sealing of the gaskets 38 and 42 without excess force that might damage the window 40.

The gaskets 38 and 40 may be deformable to provide improved sealing and may, for example, be a graphite material such as Grafoil® commercially available from NeoGraf Solutions LLC of Lakewood, Ohio, gold, or a stainless-steel metal O-ring, for example, constructed of Monel as a circular ring with a C-shaped cross-section through the ring's periphery. Metal O-rings suitable for use with the present invention are commercially available from Parker Hannifin Corp. of San Diego, California.

As noted, the cap 26 may have a central opening 52 through which the optical fibers 28 may pass to be conducted downwardly through the second tube 44 and outer tube 30.

Referring again to FIG. 2, positioned inside of the tubes 30 and 44 and behind the window 40 are distal ends of the first and second optical fibers 28a and 28b, the former providing a conduit of light from the light source 31a and the latter receiving light reflected from the mirror 58 and sending it to the light detector 31b of the spectrometer 31. Each of these optical fibers 28 may be gold or carbon coated for improved fracture resistance and resistance from environmental materials and further encased in a hypodermic tube 53. A pair of hypodermic tubes 53 holding the respective optical fibers 28, in turn, may be surrounded by a ceramic sheath 54, for example, a double bore alumina tube. The ends of the optical fibers 28 may be polish at an angle consistent with an expected direction of light propagation.

A polished end of the optical fibers 28a positioned behind the window 40 allows for downward projection of light 56 to an upwardly facing mirror 58 positioned below the window 40 by a distance d. The projected light 56 received by the mirror 58 is reflected upward as light 60 to be received by a polished end of optical fiber 28b and conducted to the spectrometer 31 for analysis. The distance d will be set to provide the maximum signal to noise ratio for given transparency of the molten salt accommodating losses in the window 40 and mirror 58.

The space between the window 40 and mirror 58 is open for the flow of molten salt 14 therethrough thus allowing for spectrographic absorption measurements or Ramen spectroscopy measurements of that molten salt 14.

The mirror 58 may be flat or desirably curved, for example, to approximate an ellipsoid so as to provide improved focusing of light received from the optical fiber 28a to the end of the optical fiber 28b.

The mirror 58 may be supported by a mirror support 64, for example, being attached to the outer tube 30 and constructed of a similar material, such as Monel (67% nickel/

23% copper). The mirror support 64 provides openings 70 between the window 40 and the mirror 58 allowing for the flow of molten salt 14 through the path of light 56 and 60 as discussed above.

The environment of molten salt 14 requires that the window 40 and mirror 58 be able to resist corrosive action that would reduce the light signal through the molten salt 14. To the extent that damage to these elements can be reduced, the path length d may be increased to provide improved signal-to-noise ratio in the measurements.

In one embodiment the window 40 and mirror 58 may have protective outer carbon surfaces. In the case of window 40, this may be provided by constructing the window 40 from a diamond sheet or by coating the exposed surface of the window 40 made of high temperature glass with a layer of carbon, for example, crystalline (e.g., diamond), glassy carbon, graphene or the like. Metal surfaces such as gold, molybdenum or nickel may also be used as an outer surface for the mirror 58 or a soft polished graphite. Diamond windows suitable for use with the present invention are available from Element Six Technologies of Santa Clara, California.

The mirror 58 may likewise have a carbon coating on a high-temperature glass substrate or the like or may be constructed entirely of carbon, for example, of a glassy carbon material. In one embodiment, the glassy carbon material may be a vitreous carbon planchet commercially available from Ted Pella, Inc. of Redding California In an alternative embodiment the mirror support 64, mirror 58 and outer tube 30 (or lower portion of the outer tube 30) may be integrated into a monolithic glassy carbon material. In this case, the window 40 may be fused to the glassy carbon material without the need for the gaskets 38 and 40 or the inner tube 44.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A high temperature probe for measurement of molten salt impurities comprising:
   a probe shaft having an axial channel extending along a probe axis to a distal channel end;
   a window resistant to molten salt and attached to the distal channel end to prevent ingress of molten salt into the channel;
   first and second optical fibers extending along the probe axis to a point proximate to the window to direct light through and receive light through the window, respectively;
   a mirror resistant to molten salt; and
   a mirror support extending along the probe axis beyond the window to hold and position the mirror to receive light from the first optical fiber and reflect the light to be received by the second optical fiber, the mirror support providing an open portion allowing passage of molten salt between the mirror and the window.

2. The high temperature probe of claim 1 wherein at least one of the window and mirror provides an outer carbon layer.

3. The high temperature probe of claim 2 wherein in the outer carbon layer is selected from diamond, glassy carbon, and graphene.

4. The high temperature probe of claim 1 wherein both of the window and mirror have an outer carbon layer.

5. The high temperature probe of claim 4 wherein the outer carbon layer is selected from glassy carbon and diamond.

6. The high temperature probe of claim 1 wherein the mirror is curved to concentrate light received from the first optical fiber on the second optical fiber.

7. The high temperature probe of claim 1 wherein the outer diameter of the optical fibers are buffered with a non-glass material selected from the group consisting of metal and carbon.

8. The high temperature probe of claim 1 wherein the probe shaft and mirror support are monolithic carbon.

9. The high temperature probe of claim 8 wherein the window is fused to the monolithic carbon.

10. The high temperature probe of claim 1 further including compression seals on either side of a periphery of the window sealing the window to the probe shaft.

11. The high temperature probe of claim 10 wherein the probe shaft includes an inner and outer tubular component flanking a front and rear surface of the window, respectively, and where a proximal end of the probe provides a compressor for shifting a relative location of the inner and outer tubular members to provide the compression on the window.

12. The high temperature probe of claim 10 wherein the compression seals are selected from a graphite material, gold, and a metal O-ring.

13. The high temperature probe of claim 1 wherein the optical fibers are held within ceramic tubes.

14. The high temperature probe of claim 1 further including a light source and an absorption spectrometer communicating with the first and second optical fibers to provide absorption measurements of impurities in molten salt.

\* \* \* \* \*